Sept. 1, 1959 P. FAHLENBERG 2,901,957
PHOTOGRAPHIC CAMERA
Filed Sept. 14, 1956 2 Sheets-Sheet 1
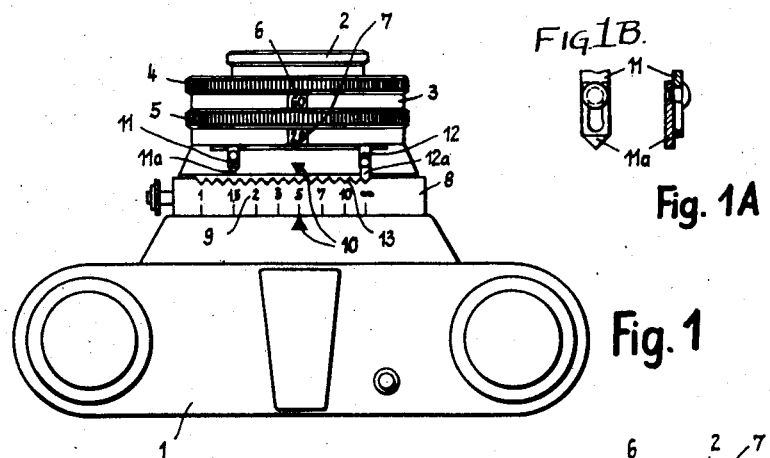
Fig. 1A
Fig. 1B
Fig. 1
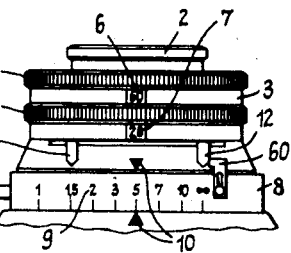
Fig. 3
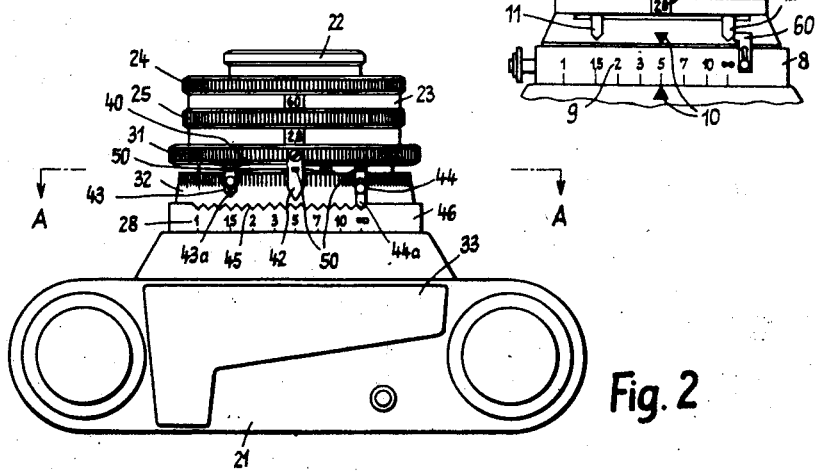
Fig. 2
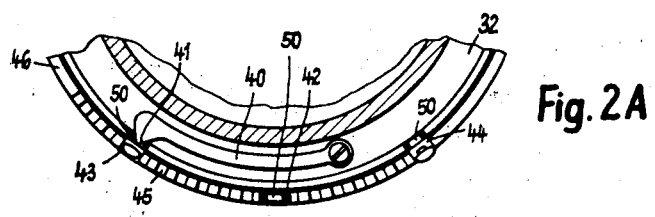
Fig. 2A Sept. 1, 1959     P. FAHLENBERG     2,901,957
PHOTOGRAPHIC CAMERA
Filed Sept. 14, 1956     2 Sheets-Sheet 2
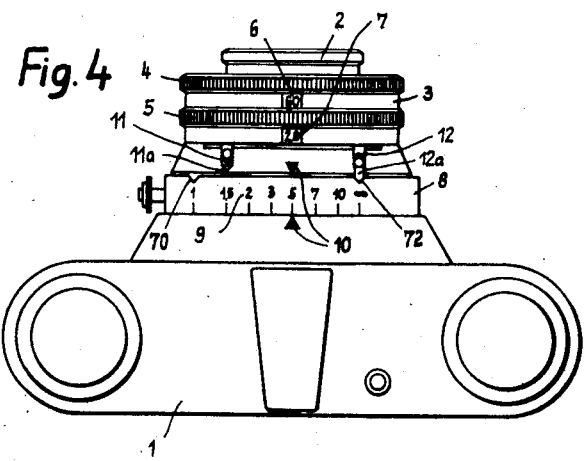
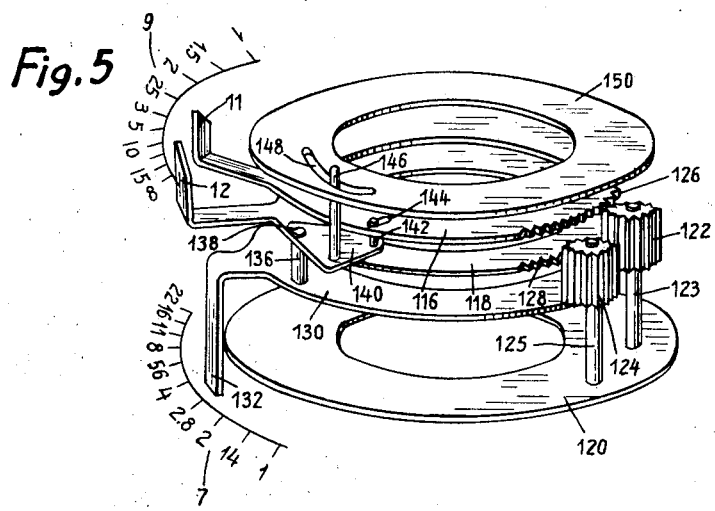

United States Patent Office 2,901,957
Patented Sept. 1, 1959

2,901,957

PHOTOGRAPHIC CAMERA

Paul Fahlenberg, Baierbrunn, near Munich, Germany, assignor to Hans Deckel, Munich, Germany, and Friedrich Wilhelm Deckel, Zug, Switzerland Application September 14, 1956, Serial No. 609,885

Claims priority, application Germany September 15, 1955

3 Claims. (Cl. 95—64)

The present invention relates to a photographic camera and in particular to a camera incorporating a depth of field indicator with movable pointers actuated by the aperture setting mechanism.

Cameras are already known in which the limits of satisfactory definition obtained with any stop aperture are automatically indicated on the focusing scale. Generally when a picture is taken, little attention is paid to this indication and, to an average distance, more particularly when the aperture is fairly small, and the depth of field correspondingly large, part of the available depth of field extends beyond the infinity point and is not therefore utilized. In fact, when the lens is focused to infinity, half the total available depth of the field is entirely lost.

It is the object of the present invention to avoid this loss. The invention which relates to cameras with an automatic depth of field indicator consists in that the member which carries the focusing scale is provided with means (stops, notches, or the like) which cooperate with at least one of the pointers of the depth of field indicator and limit the possible range of relative adjustment of focused distance and stop aperture. In an advantageous form of construction the arrangement is such that at least one of the pointers of the depth of field indicator can be connected with the member that carries the focusing scale for the purpose of effecting a joint adjustment of focused distance and stop aperture.

Several illustrative embodiments of the invention will be hereinafter described with reference to the drawings, in which:

Fig. 1 is a diagram of a photographic camera shown in plan;

Figs. 1A and 1B are sectional and front views, respectively, of a detail thereof;

Fig. 2 and Fig. 2A show an embodiment of the invention in the case of a camera with a coupled range finder;

Fig. 3 is a third embodiment of the invention;

Fig. 4 is a modification of the embodiment shown by Fig. 1; and

Fig. 5 is a diagrammatic perspective view of the principal operating parts of a depth of field indicator which is suitable for use in connection with the present invention.

Figure 1 shows a photographic camera with a camera body 1, to the face of which is secured a lens 2 and a shutter 3. For setting the shutter speed and the stop there are provided a shutter speed ring 4 and an aperture setting ring 5, the selected speed and stop aperture being indicated at 6 and 7. For focusing the camera there is further provided a rotatable focusing ring 8 which carries the focusing scale 9 and registers with the stationary central index mark 10. The lens and the shutter are longitudinally displaced in the conventional manner for instance by means of a thread. For the automatic indication of the depth of the field the camera carries two pointers 11 and 12 which are adapted to register with the focusing scale 9. These two movable pointers are actuated by the stop setting ring 5 through an appropriate gearing which causes the angular distance between the two pointers to be automatically controlled by the stop setting ring in such a way that the two pointers 11 and 12 indicate the limits of satisfactory definition on the focusing scale. There are various possible ways of relatively disposing the focusing scale, the focusing ring, the index mark and the depth of field indicator and these have been described by U.S. patent applications Ser. No. 555,964, filed December 28, 1955; Ser. No. 557,183, filed January 3, 1956; Ser. No. 558,375, filed January 10, 1956.

So far as the present invention is concerned, the mechanism for operating the depth of field indicators in all three of the copending applications just mentioned is essentially the same, and any one of these mechanisms may be used for purposes of the present invention. Fig. 5 of the present drawings is essentially a duplicate of Fig. 1 of the drawings of the above mentioned application No. 555,964, except for change of reference numerals, and the construction shown in this Fig. 5 is suitable for use in connection with the present invention. Such construction may be briefly described as follows:

The construction includes, within the shutter, two axially spaced stationary rings or annular plates 120 and 150, and two rotary rings 116 and 118 axially spaced from each other, between the rings 120 and 150. These rings are all concentric relative to the optical axis.

The ring 116 carries a radially extending arm terminating in the depth of field pointer or indicating member 11, and the ring 118 carries a radially extending arm terminating in the depth of field pointer or indicating member 12. The two rings 116 and 118 are coupled to each other to move through equal amounts in opposite directions. The preferred coupling comprises two pinions 122 and 124 rotating on their respective stub shafts 123 and 125 fixed to the stationary plate 120 and extending in directions parallel to the optical axis. The pinion 122 meshes with gear teeth 126 formed on a portion of the periphery of the first ring 116, and also meshes with teeth of the other pinion 124 which, in turn, meshes also with gear teeth 128 formed on a portion of the periphery of the second ring 118. The two pinions are of equal size, so that when either ring moves in one direction, the other ring will move to an equal angular extent in the opposite direction.

For operating these rings 116 and 118 so as to move the pointers 11 and 12 over the focus distance scale 9, there is a ring 130 also mounted for rotation concentrically with the optical axis, this ring having an arm 132 which enters a notch in the diaphragm aperture adjusting member or stop adjusting member 5, so that whenever the diaphragm is adjusted to a different aperture, the turning of the member 5 will cause corresponding turning of the ring 130, 132. The rotary movements of the part 130, resulting from changes in the diaphragm aperture or stop, are transmitted to the rings 116 and 118 through transmission means so designed that the pointer rings 116 and 118 may, if necessary, be moved in a non-linear relation to the movements of the ring 30, to any extent of irregularity or disconformity required by the particular depth of field characteristics of the lens system employed or by the particular arrangement of the graduations of the focusing scale or distance scale 9 relative to the graduations of the diaphragm aperture scale 7. To accomplish this, a stub shaft 136 is carried by and fixed to the ring 130, and extends parallel to the optical axis, and has a reduced forward end 138 on which is rotatably mounted the plate 140 lying in a plane between the rings 116 and 118. At one point the plate 140 carries a forwardly projecting pin 142 which extends into and is movable along a slot 144 formed in the ring 116. At another point on the plate 140 is a control pin 146 which projects forwardly through a controlling guide slot or cam slot 148 in the fixed ring 150. The pins 142 and 146 are angularly spaced from each other, with respect to the bearing pin 138 on which the plate 140 rotates.

The control slot or cam slot 148 is shaped in such manner as to swing the plate 140 on its pivot 138, to any extent necessary, as the plate moves bodily in one direction or the other along with the ring 130, when the diaphragm aperture is changed. The shape of the cam slot 148 is, of course, designed to give the desired motion to the plate 140, depending upon the relationship of the distance scale 9 to the diaphragm aperture scale 7. When the ring 130 turns in a direction to open up the diaphragm aperture to a larger opening (or a smaller f number on the scale 7) the bodily movement of the plate 140 will, through the driving pin 142, cause corresponding rotation of the ring 116 and, through the gears 122 and 124, opposite rotation of the ring 118, thus bringing the two pointer arms 11 and 12 closer to each other to indicate a reduction of the depth of field, which follows from the opening of the diaphragm to a larger aperture. Conversely, if the ring 130 is moved in a direction to close down the diaphragm aperture to a smaller stop (indicated by a larger f number on the scale 7) this will cause rotation of the rings 116 and 118 in a direction to separate the pointers 11 and 12 farther from each other, to indicate the increase in the depth of field which results from the smaller diaphragm stop.

However, the motions of the rings 116 and 118 will not necessarily be exactly the same in angular extent as the motion of the ring 130, but can be varied by proper shaping of the cam slot 148, to take care of the non-linear relationship between variations in diaphragm aperture size resulting from movement of the rings 5 and 130, and variations in depth of focus as expressed on the focusing scale or distance scale 9. Thus when the shape of the cam slot 148 causes the plate 140 to swing in one direction or the other on its pivot 138, then in addition to the bodily movement of the plate 140 with its pivot, the swinging movement of the plate on this pivot will shift the position of the pin 142 relative to the pivot 138 in a circumferential direction so as to cause a variation in the position of the ring 116 relative to the ring 130, so that the two rings can be made to move in a non-linear manner relative to each other.

As will be readily seen from a study of this construction, the operating gearing is of a reversible nature, so that when either of the depth of field indicating pointers is forcibly moved, this will cause movement of the other one of the depth of field indicating pointers and also cause movement of the diaphragm aperture adjusting or setting ring. Of course when the diaphragm aperture adjusting or setting ring is turned, this will cause movement of both of the depth of field indicating pointers.

In accordance with the present invention, and as shown in Figures 1A and 1B, either one or both the pointers of the depth of field indicator are provided with end pieces 11a and/or 12a which are longitudinally displaceable and which can be brought into engagement with the focusing ring 8 in one of several positions, in such a manner that it is possible for the focusing ring to be entrained with the depth of field indicator or vice versa.

The operation of an arrangement of this kind will be readily understood. Let it be assumed that, for example, the pointer 12 of the depth of field indicator, which indicates the more distant limit of satisfactory definition, has been brought into engagement with a notch 13 in the focusing ring 8 at the infinity point. As soon as the aperture setting 5 is rotated the resultant movement of the pointer 12 of the depth of field indicator will entrain the focusing ring 8. In other words, if the aperture is reduced and the pointers of the depth of field indicator move further apart, the focusing ring will be likewise turned in the direction of decreasing distance, the distant limit of definition remaining at infinity in view of the engagement of the pointer 12. There is therefore an assurance that the depth of field as determined by any setting of the aperture of the stop will always be fully utilised and the loss in depth referred to in the introduction completely avoided.

The arrangement may likewise be used for the purpose of obtaining a desired depth of field by setting the focusing ring. The distant pointer 12 remains locked at infinity whereas the near pointer 11 is set to the near limit of focus by rotating the focusing ring. Owing to the engagement of the pointer 12 with the ring 9 any rotation of the focusing ring will at the same time actuate the stop mechanism through the depth of field indicator 12 and its mechanism.

It is, of course, also possible to provide other positions at which the pointers of the depth of field indicator and the focusing member can be locked together. For instance the near pointer 11 might be engaged at the point which corresponds with the distance from the camera of a particular object, such as a person it is desired to photograph, and the stop or focused distance adjusted to ensure that the entire field from the said object or person to infinity will have satisfactory definition. Alternatively, the distant pointer 12 may be brought into engagement at the point corresponding with the distance from the camera of the object in question so that the entire depth of field may be set to extend from a point between the camera and the said object. The result of this would be for the background to be out of focus i.e. of being blurred.

In Figure 1 the camera is focused with reference to the focusing scale, i.e. adjusted to a distance which has been either estimated or measured by means of a separate range finder.

Clearly the invention can be likewise applied to a camera provided with a coupled range finder. By locking the distant pointer at the infinity point and focusing the camera to the desired object, the aperture of the stop can be simultaneously and automatically set to a value which will just extend the depth of the field to infinity, and the loss of field depth hereinabove already referred to will not then occur. However, in the case of a camera equipped with a coupled range finder the alternative possibilities that have been described can be only inadequately performed because the plane of focus set by means of the range finder will always coincide with the central index mark. However, even in a camera with automatic focusing the above described possibilities may be utilised if, according to a further development of the invention, the range finder and the focusing ring on the lens can likewise be coupled in different relative positions, and more particularly, in such a way that the plane focused in the range finder will coincide either with the central index mark or with the near or the distant pointer of the depth of field indicator. Such an embodiment is shown in Figure 2. In principle, the camera is constructed as in the previous example. In other words, there are again provided lens 22 and a shutter 23 on the front of the camera body 21. The shutter speed and the aperture of the stop are controlled by a speed ring 24 and an aperture setting ring 25. Unlike the arrangement illustrated in Fig. 1 the focusing scale 28 in the present instance is fixed, focusing being performed by rotating the ring 31 in relation to the stationary scale. Inside the housing of the lens the setting ring 31 is connected in the conventional manner with a cam which cooperates through intermediate elements with the range finder 33 built into the camera body. In a camera of conventional construction this cam is rigidly coupled with the focusing ring so that the focusing scale will indicate the distance to which the camera has been focused with the aid of the range finder—for instance by two images in the range finder having been brought to coincidence.

Unlike the known arrangement the embodiment of the invention illustrated in Figures 2 and 2a provides a second ring 32 adapted for rotation relatively to the setting ring 31, the cam being rigidly connected with this second ring. The ring 32 is concentric with the ring 31 and can be rotated in relation thereto. The ring 25 carries the gearing for the actuation of the pointers 43 and 44 of the depth of field indicator, so that these pointers will move in relation to the fixed central index mark 42 on the ring 31 according to the particular setting of the stop aperture, and thus indicate the depth of the field on the focusing scale 28. The pointers 43 and 44 of the depth of field indicator and the central index mark 42 are so devised that the ring 32 which carries the actuating cam for the range finder can be coupled with one of the said three elements. This is diagrammatically illustrated in Figure 2a which is a cross section on line A—A in Figure 2 on an enlarged scale. The near and distant pointers 43 and 44 of the depth of field indicator are symmetrically moved towards or away from the central mark 42 through the above mentioned gearing which is actuated by the aperture setting mechanism. The undersides of the three pointers are provided with notches 50. A catch 41 at the end of a spring 40 attached to the ring 32 is adapted to engage the notch in either the central mark 42 or one of the two pointers 43, 44 of the depth of field indicator. The pointers 43 and 44 are also adapted to be engaged with the teeth 45 in the stationary ring 46 which carries the focusing scale.

Let it be assumed, for instance, that the distant pointer 44 of the depth of field indicator is coupled with ring 46 which carries the focusing scale 28, at the infinity mark, and that at the same time the point of focus of the range finder is coupled with the near pointer 43 of the depth of field indicator by bringing spring 40 into engagement therewith. When in such circumstances the camera is focused with the aid of the range finder it will be possible for instance to bring into focus an object or person in the foreground, but owing to the two pointers of depth of field indicator being coupled, on the one hand, with the focusing ring and, on the other hand, with the range finder control ring, the stop aperture will be likewise varied through the depth of field indicator in such a manner that the depth of field will just extend from the object it is desired to photograph to infinity.

Other possibilities of utilizing this supplementary arrangement will be readily understood from the explanations that have already been given with reference to Figure 1.

It will be clear that a camera constructed according to the present invention will be particularly simple to manipulate if it includes a coupling between shutter and diaphragm, as described for instance in U.S. patent application, Ser. No. 389,779, filed November 2, 1953 (now Patent 2,829,574, granted April 8, 1958). In this case, after a certain exposure value has been set—for instance after consulting an exposure meter—no further thought is required for setting an appropriate shutter speed or stop aperture because with the help of the arrangement provided by the invention these factors are automatically set by suitably selecting and positioning the limits of good definition within the picture it is desired to take.

In the embodiments that have been described the member which carries the focusing scale is provided with teeth with which at least one of the pointers of the depth of field indicator can be brought into engagement. However the application of the principle underlying the present invention would merely require that the member carrying the focusing scale is provided with one or several stops which cooperate with at least one of the pointers of the depth of field indicator and thereby restrict the possible combinations of the settings of the focused distance and aperture of the stop. Figure 3 shows such a simplified form of construction which corresponds with the general arrangement in Figure 1. In Figure 3 a stop 60 is provided only at the infinity point of the scale. In other words, the distance pointer of the depth of field indicator cannot be displaced beyond the infinity mark. The camera cannot therefore be focused beyond a distance at which the depth of field will just extend to infinity and at which the distance pointer of the depth of field indicator will come into contact with the stop. If required, this stop may also be so arranged that it can be rendered ineffective, by being movable out of the path of the pointer 12, as shown in Figure 3.

In the embodiments according to the Figs. 1 and 2 the member which carries the focusing scale is provided with a plurality of notches. However, the present invention might equally well be applied in cases in which said focusing scale member carries only one or a few notches at preferred distance points. Fig. 4 shows such a simplified embodiment which corresponds with the general arrangement in Fig. 1. In Fig. 4 the focusing scale member 8 is provided with notches 70 and 72 only at the initial and infinity points of the focusing scale 9; one of the pointers 11a or 12a engaging one of said notches 70 or 72, respectively. It will be readily understood, that the present embodiment operates in the same manner as the arrangement according to Fig. 1.

The above described examples all relate to ordinary photographic cameras. However, it will be readily understood that the invention is not intended to be limited to this type of apparatus. The invention might equally well be applied with advantage for instance to motion picture cameras. In all such cases the main inventive idea resides in the fact that at least one of the pointers of the depth of field indicator is connected cooperatively in a suitable manner that corresponding adjustment or joint setting of the focused distance and stop aperture is effected.

What is claimed is:

1. A photographic camera comprising a diaphragm aperture adjusting member rotatable about an axis, a focusing distance scale, a pair of depth of field indicating members movable toward and away from each other over said scale, means coupling said indicating members to each other and to said aperture adjusting member to move both of said indicating members from movement of said adjusting member and to move said adjusting member and one of said indicating members from movement of the other of said indicating members, and means for holding either one of said indicating members in any selected one of a plurality of predetermined positions relative to said scale.

2. A photographic camera comprising a diaphragm aperture adjusting member rotatable about an axis, a focusing distance scale, a pair of depth of field indicating members movable toward and away from each other over said scale, means coupling said indicating members to each other and to said aperture adjusting member to move both of said indicating members from movement of said adjusting member and to move said adjusting member and one of said indicating members from movement of the other of said indicating members, a range finder control member rotatable concentrically with said aperture adjusting member, and releasable means for coupling said control member to one of said indicating members to move said indicating members from movement of said control member and to move said control member from movement of said indicating members.

3. A photographic camera comprising a diaphragm aperture adjusting member rotatable about an axis, a focusing distance scale, a pair of depth of field indicating members movable toward and away from each other over said scale, means coupling said indicating members to each other and to said aperture adjusting member to move both of said indicating members from movement of said adjusting member and to move said adjusting member and one of said indicating members from movement of the other of said indicating members; a range finder control member rotatable concentrically with said aperture adjusting member, a range finder operating ring mounted for rotation concentrically with said aperture adjusting member and said control member, a pointer carried by said operating ring and sweeping across said scale when said ring is turned, and releasable means for coupling said control member selectively either to said operating ring to turn therewith, or to one of said indicating members to move therewith.

References Cited in the file of this patent
UNITED STATES PATENTS

| | | |
|---|---|---|
| 2,342,819 | Priesemann | Feb. 29, 1944 |
| 2,350,009 | Babcock et al. | May 30, 1944 |
| 2,526,522 | Wallendorf | Oct. 17, 1950 |

FOREIGN PATENTS

| | | |
|---|---|---|
| 139,562 | Austria | Nov. 26, 1934 |
| 1,111,448 | France | Oct. 26, 1955 |